Patented Nov. 11, 1952

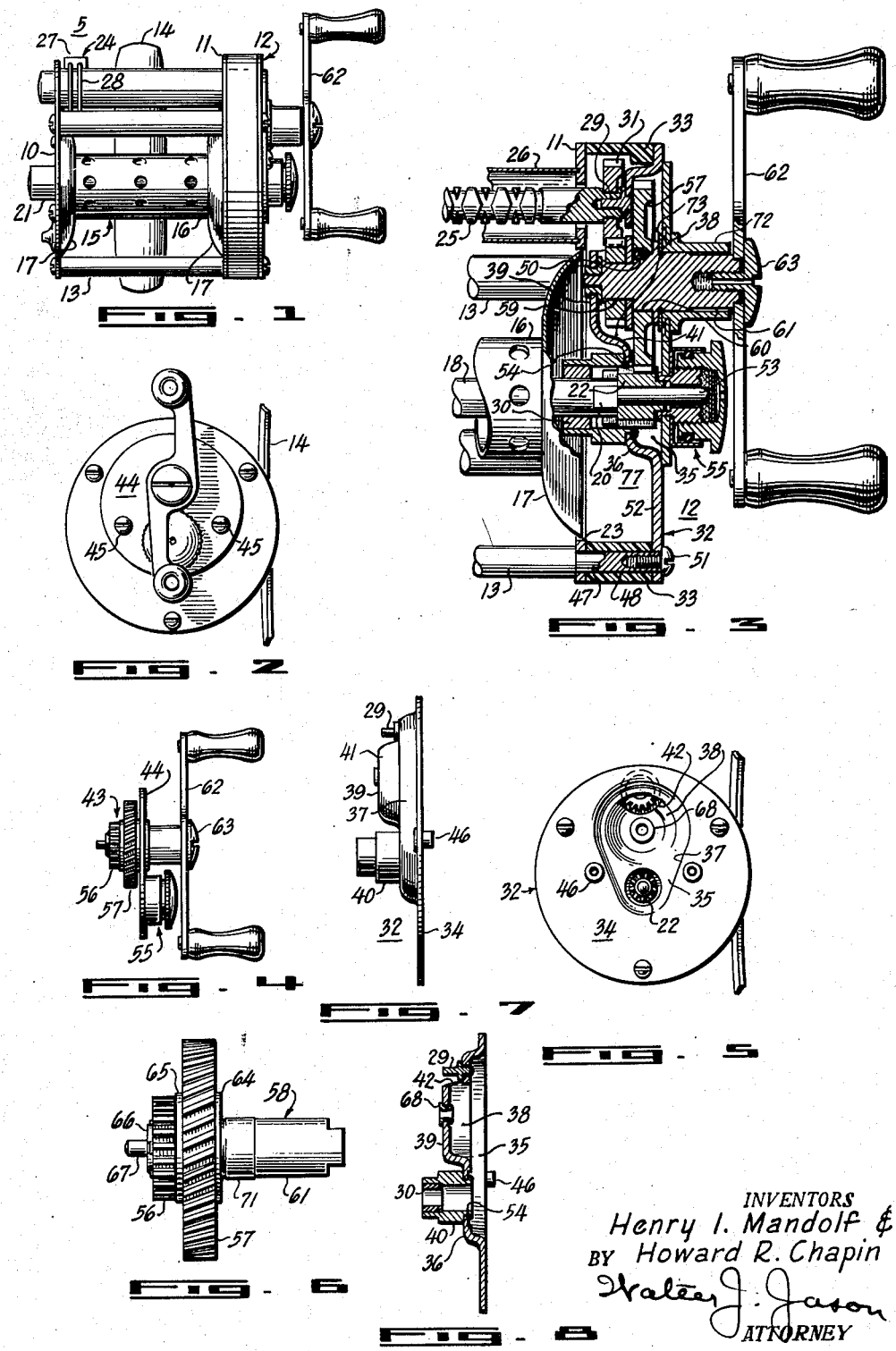

2,617,612

UNITED STATES PATENT OFFICE 2,617,612

FISHING REEL

Henry Ikarus Mandolf and Howard R. Chapin, San Diego, Calif., assignors to Langley Corporation, San Diego, Calif., a corporation of California Application February 4, 1949, Serial No. 74,498

10 Claims. (Cl. 242—84.4)

This invention relates to fishing reels and more particularly to an improved construction and design for level winding casting fishing reels.

One object of the present invention is to provide in a fishing reel an improved form of gear housing.

Another object of this invention resides in the provision of a unique construction for a fishing reel permitting the ready disassembling and removal of various major components for ease of inspection, lubrication or repair of the fishing reel.

Another object of the invention is the provision in a fishing reel of an improved form of gear housing having a construction which adapts the drive gears of the fishing reel to be readily and accurately mounted in operative position and which further permits withdrawal of the gear housing together with the crank and the drive gears maintained in assembled relation.

A further object of the invention lies in providing an improved form of fishing reel gear housing which adapts the fishing reel drive gears to be journaled in novel manner, and which utilizes a unique arrangement and combination of bearing members for rotatably supporting the various shafts of the fishing reel.

A still further object of the present invention is the providing of an improved construction for the gear housing of a fishing reel which renders the gear housing simple in design permitting the manufacture thereof at reduced cost, and which improved construction adapts it to house and mount the fishing reel drive gears and shaft elements in efficient and effective manner and with greater rigidity over known mounting methods.

Other objects and features of the present invention will be readily apparent to those skilled in the art from the following specification and appended drawings wherein is illustrated a preferred form of the invention, and in which:

Figure 1 is a top plan view of a level winding reel embodying a gear housing constructed in accordance with the present invention;

Figure 2 is an end view of the reel illustrated in Figure 1;

Figure 3 is an enlarged fragmentary view, partially in section, of the reel of Figure 1;

Figure 4 is an elevational view of the crank and drive gear assembly;

Figure 5 is a view similar to Figure 2 but with the crank and drive gear assembly removed;

Figure 6 is an enlarged elevational view of the drive gears;

Figure 7 is a side elevational view of the cap member of the gear housing; and

Figure 8 is a vertical sectional view of the cap member of Figure 7.

Reference will now be had with more particularity to the drawings in which like characters of reference are used to designate like parts throughout the various views. In the drawings there is illustrated a level winding fishing reel frame, indicated generally by the numeral 5, which comprises a tail plate 10, a head plate 11, and a housing assembly 12. Tail plate 10 and head plate 11 are connected together and maintained in spaced relation by a plurality of pillars 13 which are secured to the plates 10 and 11 at their ends in suitable manner. A usual reel seat plate 14 for securing the reel to a fishing rod is mounted upon two adjacent pillars 13 by suitable means.

Located between the tail plate 10 and head plate 11 is a spool 15 which comprises a cylindrical perforated drum portion 16 having dished flanges 17 provided at each end thereof. To rotatably mount the drum 16 there is afforded a shaft 18 which passes coaxially through the drum 16 and through the spaced flanges 17 and is suitably rigidly connected to the flanges so that the drum 16 and shaft 18 turn in unison. A bearing 21 carried by the tail plate 10 journals one end of the shaft 18. The other end of shaft 18 mounts a pinion 22 and is rotatably supported at the housing assembly 12 by means to be hereinafter described. It is noted that the shaft 18 is located in frame 5 with its axis offset from the axis of the fishing reel.

An annular opening 23 provided in head plate 11 affords an exit for the spool 15 whereby the spool 15 may be withdrawn from the frame 5 after removal of housing assembly 12.

A level wind mechanism 24, of conventional construction, is carried by frame 5 and comprises a usual reversely threaded traversing shaft 25, a housing or guard 26 for this shaft, which housing extends between and is suitably supported by the tail plate 10 and head plate 11, and a line guide carriage 27 slidably carried by shaft 25. The line guide carriage 27 includes a usual shaft engaging pawl, not shown, and a line guide eye 28 extending over the guard 26. One end of the traversing shaft 25 is journaled at tail plate 10 and the opposite end is rotatably supported by a bearing pin member 29 provided by housing 12 and which pin is adapted to fit within a recess located in the end of shaft 25. A pinion 31 is mounted upon a reduced portion of the shaft 25 which extends into gear housing 12.

The housing assembly 12 comprises a cap member 32 and an annular member 33, which latter member is formed of a suitable plastic, but which may be made from any light-weight material. The cap member 32 is formed of a light-weight metal, such as aluminum, and is stamped into the desired shape. As shown in the drawings the cap member 32 comprises a flat annular plate 34 in which is formed an eccentrically located recess or chamber 35, which chamber is provided with a base 36 and a defining wall 37 and which opens outwardly of the fishing reel. Formed in base 36 of chamber 35 is a smaller chamber 38, substantially circular in shape, having a base 39 and a defining wall 41 and with a portion of base 39 and wall 41 being removed to effect an opening 42, which affords access from one side of the cap member 32 to the other. The bearing pin member 29 is rigidly affixed to the base 39 and projects therefrom toward the frame. Chambers 35 and 38 combine to afford a receptacle within which a drive gear assembly 43, to be described, is operatively mounted.

To close chamber 35 there is provided a cover plate 44 which is secured to cap member 32 by a pair of screws 45 which are threaded into a pair of lugs 46, provided by the cap member.

To mount the gear housing assembly 12 to fishing reel frame 5, and maintain the plastic spacer ring 33 and the cap member 32 assembled, various of the pillars 13 are turned down at one of their ends, as clearly shown in Figure 3, to provide reduced portions 47 which are adapted to be fitted into openings 48 extending through ring 33; the ends of the portions 47 are tapped and screws 51 are threaded thereinto to secure the cap member 32 in position and hold the housing assembly 12 upon reel frame 5.

Forming a pair of chambers 35 and 38 in cap member 32 results in there being three flat surfaces provided, which surfaces are disposed in three parallel planes. These surfaces are comprised of interior surface 52 of cap member 32, which is spaced farthest from head plate 11, base 36 of recess 35, which is at the central level, and base 39 of recess 38, which lies closest to head plate 11.

Spool shaft 18, at the end thereof adjacent gear housing 12, is provided with a squared portion 20 from which extends a spindle 53. Pinion 22 is fitted upon squared portion 20 in suitable manner to effect a releasable connection between the pinion 22 and the shaft 18. A bearing 30 provided by cap member 32 journals the spool shaft 18, rotatably supporting it at a point adjacent the squared portion 20. Bearing 30 is located and maintained in desired position by a tubular fitting 40 which supports the bearing, and which fitting in turn is connected to the base portion 36, being suitably rigidly secured thereto as by upsetting the end thereof. Tubular fitting 40 opens into chamber 35 through an opening 54 in base 36. It is to be noted that a portion of pinion 22 is accommodated and housed by the tubular fitting 40, with the remainder of the pinion extending through the opening in base 36 and into chamber 35.

Spindle 53, projecting from the end of spool shaft 18, extends through the pinion 22 and into a brake assembly 55, the exact construction of which forms no part of the present invention and whose purpose here is to serve merely as a frictional device which acts on the end of the spindle 53 to provide a drag or braking action to prevent over-running of the spool 15 when casting. The frictional device 55 is substantially the same as the frictional device which is described in detail and forms the subject matter of a co-pending application filed May 31, 1946, Serial No. 673,305, now abandoned, wherein the frictional device is described as serving both as a bearing for the spool shaft and as a brake upon the rotative movement thereof. The only distinction of the frictional device 55 utilized in the present invention over that of the co-pending application lies in that device 55 is not required to serve as a bearing for the spool shaft. The bearing support for the squared end of spool shaft 18 is, as has been described, provided by a bearing 30 carried by the gear housing 12.

To effect rotative movement of traversing shaft 25 of the level wind mechanism 24 and of shaft 18 and the drum 16 that it carries there is provided the drive gear assembly 43. Drive gear assembly 43 includes a gear or pinion 56 adapted to mesh with pinion 31 on traversing shaft 25 and a gear 57, of larger diameter than gear 56, for engaging with pinion 22 carried by spool shaft 18. When in assembled and operative position in gear housing 12, as shown in Figure 3, the smaller drive gear 56 will lie within annular chamber 38 and mesh with pinion 31 through opening 42 and the larger gear 57 will be disposed in main chamber 35 to engage gear 22 projecting through opening 54. With cover plate 44 secured in place on cap member 32 access to chambers 35 and 38 is closed off and in effect a self-contained gear box is provided from which dirt and other foreign matter is excluded and out of which grease or other lubricants cannot exude to soil the hands of the user.

Drive gear assembly 43 includes an elongated, solid, drive shaft 58, formed of a suitable metal, having a reduced diameter portion 59, upon which the drive gear 56 is rigidly mounted, a mid-portion 60 of larger diameter, which carries the gear 57, and a main cylindrical portion 61 upon the end of which is mounted a hand crank 62 which is secured in place by a screw 63. An integral, annular, outwardly projecting flange 64 is provided by the drive shaft 58 at the juncture of the shaft portions 60 and 61, and against which flange 64 the larger drive gear 57 is disposed. A ball bearing element 50 fitted into an appropriate recess cut in gear 57 and shaft portion 60 serves as a locking means to prevent rotation of the gear on its support. A washer 65 spaces small drive gear 56 from drive gear 57, and the end 66 of portion 59 is worked or peened to fix gear 56 in place and to insure that the gear 56 does not slip from the drive shaft 58.

Projecting from the end 66 of drive shaft 58 is a cylindrical integral portion 67 which is adapted to journal in a bearing 68 provided by base 39 of recess 38. As best seen in Figure 6, the main cylindrical portion 61 of drive shaft 58 is turned down for a portion of its length to leave a segment 71 which is of slightly larger diameter. The annular surface of this segment 71 effects a journal or bearing area for the drive shaft 58. The drive shaft 58 is thus provided with two annular bearing or journaling areas, the one provided by the outer surface of projection 67 and the other by the annular surface of segment 71, which bearing areas are spaced from one another and separated by the drive gears 56 and 57.

Mounted upon the cover plate 44 is an outwardly projecting tubular element or thimble 72, coaxially aligned with bearing 68, which element 72 is secured to cover plate 44 as by peening, or which may be secured in any other suitable manner, or if desired, it could be formed integral with the cover plate. The thimble 72 serves as a bearing and into which extends the drive shaft 58. Flange 64 will bear against a spacer washer to engage the interior surface of bearing 72. In the mounted position of the drive gear assembly 43 the bearing projection 67 of the drive shaft 58 will rest within bearing 68 and the end 66 of the reduced shaft portion 59 will bear against the end surface of this bearing so that end 66 serves as a thrust bearing area for the drive shaft 58. Flange 64 will bear against a spacer washer 73 carried by the drive shaft 58 and which lies between the flange 64 and the inner end of thimble 72.

It is apparent from the above description that the bearing supports for the gear drive shaft 58 are provided by the two bearing members 68 and 72 which are located on either side of the drive gears 56 and 47. Locating the bearing members 68 and 72, one on each side of the drive gears, serves to provide a more effective and more desirable mounting for the drive shaft 58, for the spacing of these supports will prevent the occurrence of eccentric loading, will obviate any tendency of the shaft to cock or misalign, and will thereby reduce friction wear on the shaft which would result from a condition of eccentric loading or misalignment.

Normally the cover plate 44 carries the drive gear assembly 43 and the crank 42 and when the cover plate 44 is secured to cap member 32 the drive gears 56 and 57 will be located in their operative positions in chambers 38 and 35 and intermeshing respectively with their cooperating gears 31 and 22. To free the drive gear assembly 43 from the cover plate 44 it is necessary only to remove screw 63 which permits the crank 62 to be detached so that drive shaft 58 can be axially withdrawn from thimble 72.

The level wind traversing shaft 25 is prevented from moving end-wise out of its operative position by bearing pin member 29 which is carried by base 38 and extends into a recess in the end of the shaft 25.

The various gears of the fishing reel described herein, as is apparent from the drawings, are disposed, when in operative relationship, in a number of chambers, with traversing shaft pinion 31 located in chamber 77 with spool shaft pinion 22 disposed in tubular fitting 40 projecting into chamber 35 within which is located large drive gear 57, and with small drive gear 56 operative within annular chamber 38.

The present invention also provides a novel arrangement and location of bearing elements for the various rotating shafts utilized by the fishing reel. Bearing pin 29 for traversing shaft 25, bearing 68 for gear shaft 58 and bearing 30 for spool shaft 18 are all supported by the cap member 32 of gear housing 12. The operative positions of the various bearing elements are by reason of this support by a single member 32 all definitely and fixedly positioned relative to one another. This construction obviously will result in the accurate locating within the fishing reel of the shafts which cooperate with these bearing elements. As a result there will be less wear on the various parts and a more efficient device is effected.

By the utilization of parts of the type and construction herein described it is possible to produce a simple and compact fishing reel and to assemble the various elements into their operative positions readily and efficiently. Comparatively little care is required in assembling of the parts by reason of their design, which inherently adapts these parts to fit together in the required relationship.

The provision of spaced annular areas 67 and 71 on the main drive shaft 58 lends to the effectiveness and the economies of the present device since it affords a simplified method of adequately and efficiently journaling the drive shaft 58. Shaft 58 can be readily and economically machined to effect the required journaled surfaces, and the present shaft design permits the use of minimum journaling areas. Spacing of the journaling areas provides for a desirable rigid mounting of the shaft.

The construction described permits the fishing reel to be more easily maintained, cleaned and greased. The gear trains are readily available to inspection merely with the removal of the cover plate 44 which carries with it the drive gear assembly 43 and the crank 62; the remaining gears, the spool and the traversing shaft are not disturbed and are left in their operative position.

Further, if it is desired to have access to the transverse shaft 25 or the spool 15 the whole gear housing 12 is readily removed by withdrawal of screws 51. In this case, the cap member 32 will be carried away and will carry with it pinion 22 together with the drive gear assembly 43. Pinion 22 will in this case remain in meshing engagement with its cooperating drive gear 57. Refastening the cap member 32 to the frame will return the various gears to their operating positions and will effect the journaling of transverse shaft 25 and spool shaft 18 and provide for the interconnection between these shafts and the gear system carried by cap member 32.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. In a fishing reel, a frame including interconnected head and tail plates, a housing positioned adjacent said frame, a line guide traversing shaft, a pinion provided therefor, means for rotatably mounting said line guide traversing shaft, said means comprising a bearing pin member carried by said housing and extending into a recess provided in the end of said traversing shaft, a spool, a spool shaft, means for rotatably mounting said spool shaft, said means comprising a bearing, a tubular fitting supporting said bearing, said tubular fitting being mounted on said housing, a pinion on said spool shaft disposed within said tubular fitting, a drive gear assembly, said drive gear assembly comprising a gear for cooperating with said traversing shaft pinion, a gear for cooperating with said spool pinion, and a drive shaft for mounting said drive gears, a pair of bearing members provided by said housing for positioning said drive shaft for rotative movement, said pair of bearing members being located one on each side of said pair of gears carried by the drive shaft, a crank operatively connected to said drive shaft for actuation thereof to effect rotative movement of said spool shaft and said line guide traversing shaft, means removably mounting said housing to said head plate whereby said housing on removal carries with it said bearing pin member, said tubular fitting and the bearing supported thereby, said spool shaft pinion, said drive gear assembly and the pair of bearing members therefor, and said crank.

2. In a fishing reel, in combination, a frame including interconnected head and tail plates, a rotatively mounted spool provided with a pinion, a rotatively mounted line guide traversing shaft, a pinion provided therefor, a housing positioned adjacent said head plate, said housing comprising an annular spacer member and a cap member comprising a plate member connected thereto to define a gear chamber to contain said traversing shaft pinion, said cap member having a recess provided in the exterior face thereof, which recess communicates with said gear chamber, a bearing member carried by said cap member for rotatively mounting an end of said traversing shaft, a second bearing member supported on said cap member for rotatively mounting an end of said spool shaft, a drive gear assembly, said drive gear assembly comprising a gear for meshing with said spool pinion, a second gear for meshing with said traversing shaft pinion, said drive gears being disposed in said recess, and a drive shaft for mounting said drive gears, a pair of coaxially aligned bearing members supported one on each side of said drive gears for positioning said drive shaft for rotative movement on said cap member, a crank operatively connected to said drive shaft for actuation thereof to effect rotative movement of said spool and said line guide traversing shaft, and a removable cover for closing said recess.

3. In a fishing reel, in combination, a frame including interconnected head and tail plates, a rotatively mounted spool provided with a pinion, a rotatively mounted line guide traversing shaft, a pinion provided therefor, a housing positioned adjacent said head plate, said housing comprising an annular spacer member and a cap member connected thereto to define a gear chamber to contain said traversing shaft pinion, said cap member having a recess provided in the exterior face thereof, which recess communicates with said gear chamber, a bearing member carried by said cap member for rotatively mounting an end of said traversing shaft, a second bearing member supported on said cap member for rotatively mounting an end of said spool shaft, a drive gear assembly, said drive gear assembly comprising a gear for meshing with said spool pinion, a second gear for meshing with said traversing shaft pinion, said drive gears being disposed in said recess, and a drive shaft for mounting said drive gears, a journal portion on said drive shaft adjacent an end thereof, a second journal portion on said drive shaft spaced from the first journal portion, a pair of coaxially aligned bearing members supported one on each side of said drive gears cooperating with said journal portions for positioning said drive shaft for rotative movement on the cap member, a crank operatively connected to said drive shaft for actuation thereof to effect rotative movement of said spool and said line guide traversing shaft, and a removable cover for closing said recess.

4. In a fishing reel, in combination, a frame including interconnected head and tail plates, a rotatively mounted spool provided with a pinion, a rotatively mounted line guide traversing shaft, a pinion provided therefor, a housing positioned adjacent said head plate, said housing comprising an annular spacer member and a cap member connected thereto to define a gear chamber to contain said traversing shaft pinion, said cap member having a recess provided in the exterior face thereof, which recess communicates with said gear chamber, a bearing member carried by said cap member for rotatively mounting an end of said traversing shaft, a second bearing member supported on said cap member for rotatively mounting an end of said spool shaft, a drive gear assembly, said drive gear assembly comprising a gear for meshing with said spool pinion, a second gear for meshing with said traversing shaft pinion, said drive gears being disposed in said recess, and a drive shaft upon which said drive gears are fixedly secured, a projecting cylindrical portion extending from an end of said drive shaft, a portion of enlarged diameter provided on said drive shaft and spaced from said projecting portion, means for positioning said drive shaft for rotative movement on said cap member comprising a first bearing member on one side of said drive gears and in which said projecting portion is journaled, and a second bearing member on the opposite side of the drive gears for journaling said portion of enlarged diameter, a crank operatively connected to said drive shaft for actuation thereof to effect rotative movement of said spool and said line guide traversing shaft, and a removable cover for closing said recess.

5. In a fishing reel, in combination, a frame including interconnected head and tail plates, a rotatively mounted spool provided with a pinion, a rotatively mounted line guide traversing shaft, a pinion provided therefor, a housing positioned adjacent said head plate, said housing comprising an annular spacer member and a cap member comprising a plate member connected thereto to define a gear chamber to contain said traversing shaft pinion, said cap member having a recess provided in the exterior face thereof, which recess communicates with said gear chamber, a removable cover plate for closing said recess, a bearing member carried by said cap member for rotatively mounting an end of said traversing shaft, a second bearing member supported on said cap member for rotatively mounting an end of said spool shaft, a drive gear assembly, said drive gear assembly comprising a gear for meshing with said spool pinion, a second gear for meshing with said traversing shaft pinion, said drive gears being disposed in said recess, and a drive shaft upon which said drive gears are fixedly mounted, a projecting cylindrical portion extending from an end of said drive shaft, a portion of enlarged diameter provided on said drive shaft and spaced from said projecting portion, means for positioning said drive shaft for rotative movement on said cap member comprising a first bearing member supported on one side of said drive gears and in said recess and in which bearing said projecting portion is journaled, and a second bearing member, coaxially aligned with the first bearing member, mounted on the opposite side of said drive gears on said cover plate for journaling said portion of enlarged diameter, and a crank operatively connected to said drive shaft for actuation thereof to effect rotative movement of said spool and said line guide traversing shaft.

6. In combination in a fishing reel, a frame, a rotatively mounted spool, a pinion associated therewith, a rotatively mounted line guide traversing shaft having a pinion operatively associated with it, a housing detachably mounted on said frame, said housing comprising an annular spacer member and a cap member which cooperate to define a gear chamber for containing said traversing shaft pinion, said cap member having a recess provided in the exterior face thereof, which recess communicates with said gear chamber, a removable cover plate carried by cap member for closing said recess, a bearing member carried by said cap member for rotatively mounting an end of said traversing shaft, a second bearing member supported on said cap member for rotatively mounting an end of said spool shaft, a drive gear assembly rotatively mounted on said cover plate, said drive gear assembly comprising a gear for meshing with said spool pinion, a second gear for meshing with said traversing shaft pinion, said drive gears being disposed in said recess and a drive shaft for mounting said drive gears, a crank operatively connected to said drive shaft for actuation thereof, a pair of bearing members for supporting said drive shaft for rotative movement, one of said bearing members positioned on one side of said drive gears and carried by said cover plate and the other bearing member being carried by said cap member and positioned on the opposite side of said drive gears, and means for rotatively attaching one end of said drive shaft to said cover plate whereby said drive gear assembly and said crank are removable with said cover plate and in assembled relationship.

7. In combination in a fishing reel, a frame including interconnected tail and head plates, a rotatively mounted spool, a pinion associated therewith, a rotatively mounted line guide traversing shaft having a pinion operatively associated with it, a housing detachably mounted on said frame, said housing comprising a ring spacer member and a cap member, said ring member and said cap member cooperating to define a gear chamber for containing said traversing shaft pinion, said cap member having a recess provided in the exterior face thereof, which recess communicates with said gear chamber, a removable cover plate carried by cap member for closing said recess, a bearing member carried by said cap member for rotatively mounting an end of said traversing shaft, a second bearing member supported on said cap member for rotatively mounting an end of said spool shaft, a drive gear assembly comprising a gear for meshing with said spool pinion, a second gear for meshing with said traversing shaft pinion, said drive gears being disposed in said recess, and a drive shaft for mounting said drive gears, a journal portion on said drive shaft adjacent an end thereof, a second journal portion on said drive shaft spaced from the first journal portion, a pair of coaxially aligned bearing members cooperating with said journal portions for positioning said drive shaft for rotative movement, one of said bearing members positioned on one side of said drive gears and carried by said cover plate and the other bearing member, positioned on the opposite side of said drive gears and carried by said cap member, a crank for said drive shaft and means for securing one end of said drive shaft to said crank whereby said drive gear assembly and said crank are movably mounted on said cover plate and are removable with said cover plate and in assembled relationship.

8. In a fishing reel, the combination of tail and head plates, a spool, a spool shaft, means for rotatively mounting said spool shaft, said means comprising a bearing, a pinion on said spool shaft, a line guide traversing shaft having a pinion operatively associated therewith, means for rotatively mounting said traversing shaft, said means comprising a bearing, a housing detachably mounted adjacent said head plate, said housing comprising an annular spacer member and a cap member which cooperate to define a gear chamber for containing said traversing shaft pinion, said cap member providing a support for said spool shaft bearing and said traversing shaft bearing, said support on said cap member for said spool shaft bearing comprising a tubular fitting within which said spool shaft pinion extends, said cap member having a recess provided in the exterior face thereof, which recess communicates with said gear chamber, a cover plate carried by the cap member for closing said recess, a drive gear assembly comprising a gear for meshing with said spool shaft pinion, a second gear for meshing with said traversing shaft pinion, said drive gears being disposed in said recess, and a drive shaft upon which said drive gears are fixedly mounted, a projecting cylindrical portion extending from an end of said drive shaft, a portion of enlarged diameter provided on said drive shaft and spaced from said projecting portion, means for positioning said drive shaft for rotative movement comprising a first bearing member carried by said cap member and located on one side of said drive gears and in which said projecting portion is journaled, and a second bearing member positioned on the opposite side of said drive gears and carried by said cover plate for journaling said portion of enlarged diameter, a crank for said drive shaft and means for securing one end of said drive shaft to said crank to mount said drive gear assembly on said cover plate whereby said crank and said drive gear assembly are removable with said cover plate and in assembled relationship.

9. In combination in a fishing reel, a tail plate, a head plate, a spool, a spool shaft, a pinion therefor, means for rotatively mounting said spool shaft, said means comprising a bearing, a line guide traversing shaft having a pinion operatively associated with it, means for rotatively mounting said spool shaft, said means comprising a bearing, a housing detachably mounted adjacent said head plate, said housing comprising a cap member and a ring member spacing said cap member from said head plate and cooperating with it to define a gear chamber for containing said traversing shaft pinion, said cap member providing a support for said spool shaft bearing and said traversing shaft bearing, said support on said cap member for said spool shaft bearing comprising a tubular fitting within which said spool shaft pinion extends, said cap member comprising an annular plate member having a recess provided in the exterior face thereof, which recess communicates with said gear chamber, a cover plate carried by cap member for closing said recess, a drive gear assembly comprising a gear for meshing with said spool pinion, a second gear for meshing with said traversing shaft pinion, said drive gears being disposed in said recess, and a drive shaft upon which said drive gears are fixedly mounted, a projecting cylindrical portion extending from an end of said drive shaft, a portion of enlarged diameter provided on said drive shaft and spaced from said projecting portion, means for positioning said drive shaft for rotative movement comprising a first bearing member carried by said cap member and positioned on one side of said drive gears and in which said projecting portion is journaled and a second bearing member positioned on the opposite side of said drive gears and carried by said cover plate for journaling said portion of enlarged diameter, a crank for actuating said drive shaft, and means for attaching one end of said drive shaft to said crank to mount said drive gear assembly to said cover plate, said crank and said drive gear assembly being removable with said cover plate and in assembled relationship.

10. In a fishing reel, the combination of tail and head plates, a housing detachably mounted adjacent said head plate, said housing comprising a cap member and a ring member spacing said cap member from said head plate and cooperating with it to define a gear chamber, a spool, a spool shaft, a pinion therefor, means for rotatively mounting said spool shaft, said means comprising a bearing, which bearing is supported by said cap member, a line guide traversing shaft, a pinion for said traversing shaft located in said gear chamber, means for rotatively mounting said spool shaft, said means comprising a bearing, said cap member providing a support for said bearing, said support for said spool shaft bearing comprising a tubular fitting within which said spool shaft pinion extends, said cap member comprising an annular plate member having a recess provided in the exterior face thereof, which recess communicates with said gear chamber, a cover plate carried by cap member for closing said recess, a drive gear assembly comprising a gear for meshing with said spool pinion, a second gear for meshing with said traversing shaft pinion, said drive gears being disposed in said recess, and a drive shaft upon which said drive gears are fixedly mounted, a projecting cylindrical portion extending from an end of said drive shaft, a portion of enlarged diameter provided on said drive shaft and spaced from said projecting portion, means for positioning said drive shaft for rotative movement comprising a first bearing member positioned on one side of said drive gears and supported in said recess and in which bearing said projecting portion is journaled, and a second bearing member, coaxially aligned with said first bearing member, positioned on the opposite side of said drive gears and mounted on said cover plate for journaling said portion of enlarged diameter, a crank for actuating said drive shaft, means for attaching one end of said drive shaft to said crank to rotatively mount said drive gear assembly on said cover plate, whereby said crank and said drive gear assembly are removable with said cover plate as a unit and in assembled relationship.

HENRY IKARUS MANDOLF.
HOWARD R. CHAPIN.

REFERENCES CITED

The following references are of record in the file of this patent:

UNITED STATES PATENTS

| Number | Name | Date |
|---|---|---|
| 820,609 | Shakespeare, Jr. | May 15, 1906 |
| 1,817,102 | Russell | Aug. 4, 1931 |
| 1,898,316 | Schafer | Feb. 21, 1933 |
| 1,941,227 | Russell et al. | Dec. 26, 1933 |
| 1,942,710 | Kautzky | Jan. 9, 1934 |
| 1,964,965 | Smelser | July 3, 1934 |
| 2,071,474 | Schafer | Feb. 23, 1937 |
| 2,204,125 | Dayton | June 11, 1940 |
| 2,281,481 | Clickner | Apr. 28, 1942 |
| 2,484,546 | Berlinger | Oct. 11, 1942 |
| 2,518,482 | Mandolf et al. | Aug. 15, 1950 |
| 2,531,929 | Willman | Nov. 28, 1950 |